United States Patent
Dubois et al.

(10) Patent No.: US 10,044,066 B2
(45) Date of Patent: Aug. 7, 2018

(54) FLUORINATED ELECTROLYTE COMPOSITIONS

(71) Applicant: E. I. DU PONT DE NEMOURS AND COMPANY, Wilmington, DE (US)

(72) Inventors: Charles J. Dubois, Wilmington, DE (US); George K. Kodokian, Kennett Square, PA (US); Barbara S Nyland, Hockessin, DE (US)

(73) Assignee: Solvary SA, Brussels (BE)

( * ) Notice: Subject to any disclaimer, the term of this patent is extended or adjusted under 35 U.S.C. 154(b) by 663 days.

(21) Appl. No.: 14/404,214

(22) PCT Filed: Mar. 8, 2013

(86) PCT No.: PCT/US2013/029825
§ 371 (c)(1),
(2) Date: Nov. 26, 2014

(87) PCT Pub. No.: WO2013/180783
PCT Pub. Date: Dec. 5, 2013

(65) Prior Publication Data
US 2015/0171467 A1    Jun. 18, 2015

Related U.S. Application Data

(60) Provisional application No. 61/654,190, filed on Jun. 1, 2012.

(51) Int. Cl.
| | |
|---|---|
| H01M 10/0569 | (2010.01) |
| H01M 10/0567 | (2010.01) |
| H01M 4/505 | (2010.01) |
| H01M 10/052 | (2010.01) |
| H01M 10/0525 | (2010.01) |
| H01M 10/0568 | (2010.01) |
| H01M 6/16 | (2006.01) |
| H01M 4/525 | (2010.01) |
| H01M 4/485 | (2010.01) |
| H01M 4/587 | (2010.01) |

(52) U.S. Cl.
CPC ....... *H01M 10/0567* (2013.01); *H01M 4/505* (2013.01); *H01M 4/525* (2013.01); *H01M 6/164* (2013.01); *H01M 10/052* (2013.01); *H01M 10/0525* (2013.01); *H01M 10/0568* (2013.01); *H01M 10/0569* (2013.01); *H01M 4/485* (2013.01); *H01M 4/587* (2013.01); *H01M 6/166* (2013.01); *H01M 6/168* (2013.01); *H01M 2300/0028* (2013.01); *H01M 2300/0034* (2013.01); *H01M 2300/0037* (2013.01)

(58) Field of Classification Search
CPC ......... H01M 10/0569; H01M 10/0568; H01M 10/0567; H01M 10/0525; H01M 4/485; H01M 4/505; H01M 4/587; H01M 4/525; H01M 6/164; H01M 6/166; H01M 6/168; H01M 2300/0034; H01M 2300/0037

See application file for complete search history.

(56) References Cited

U.S. PATENT DOCUMENTS

| | | | |
|---|---|---|---|
| 2,824,141 A | 2/1958 | Zisman et al. | |
| 3,006,964 A | 10/1961 | Oesterling | |
| 5,273,840 A | 12/1993 | Dominey | |
| 5,352,548 A | 10/1994 | Fujimoto et al. | |
| 5,446,134 A | 8/1995 | Armand et al. | |
| 5,534,634 A | 7/1996 | Appel et al. | |
| 5,561,232 A | 10/1996 | Hao et al. | |
| 5,659,062 A | 8/1997 | Yokoyama et al. | |
| 5,738,957 A | 4/1998 | Amine et al. | |
| 5,847,156 A | 12/1998 | Eldin et al. | |
| 5,847,188 A | 12/1998 | Yokoyama et al. | |
| 5,925,283 A | 7/1999 | Taniuchi et al. | |
| 5,962,166 A | 10/1999 | Ein-Eli et al. | |
| 6,168,878 B1 | 1/2001 | Fauteux et al. | |
| 6,337,158 B1 | 1/2002 | Nakajima et al. | |
| 6,420,069 B2 | 7/2002 | Amine et al. | |
| 6,465,135 B1 | 10/2002 | Nishimura et al. | |
| 6,495,293 B1 | 12/2002 | Arai et al. | |
| 6,506,516 B1 | 1/2003 | Wietelmann et al. | |
| 6,506,524 B1 | 1/2003 | McMillan et al. | |
| 6,534,220 B2 | 3/2003 | Garbe | |
| 6,680,145 B2 | 1/2004 | Obrovac et al. | |
| 6,723,473 B1 | 4/2004 | Oura et al. | |
| 6,878,492 B2 | 4/2005 | Takeuchi et al. | |
| 6,958,198 B2 | 10/2005 | Iwamoto et al. | |
| 6,964,828 B2 | 11/2005 | Lu et al. | |
| 7,026,070 B2 | 4/2006 | Noguchi et al. | |
| 7,078,128 B2 | 7/2006 | Lu et al. | |

(Continued)

FOREIGN PATENT DOCUMENTS

| | | |
|---|---|---|
| CN | 101617432 A | 12/2009 |
| CN | 102790236 A | 11/2012 |
| CN | 102983358 A | 3/2013 |
| CN | 103117414 A | 5/2013 |
| CN | 103165939 A | 6/2013 |

(Continued)

OTHER PUBLICATIONS

US 8,372,547, 02/2013, Koh et al. (withdrawn)

(Continued)

*Primary Examiner* — Laura Weiner
(74) *Attorney, Agent, or Firm* — Osha Liang LLP

(57) ABSTRACT

Electrolyte compositions comprising novel fluorine-containing carboxylic acid ester solvents are described. The fluorine-containing carboxylic acid ester solvents are represented by the formula $R^1$—C(O)O—$R^2$, wherein
  $R^1$ is $CH_3CH_2$— and $R^2$ is —$CH_2CHF_2$,
  $R^1$ is $CH_3$— and $R^2$ is —$CH_2CH_2CHF_2$,
  $R^1$ is $CH_3CH_2$— and $R^2$ is —$CH_2CH_2CHF_2$,
  $R^1$ is $CHF_2CH_2CH_2$— and $R^2$ is —$CH_2CH_3$, or
  $R^1$ is $CHF_2CH_2$— and $R^2$ is —$CH_2CH_3$.
The electrolyte compositions are useful in electrochemical cells, such as lithium ion batteries.

14 Claims, No Drawings

(56) References Cited

U.S. PATENT DOCUMENTS

| | | |
|---|---|---|
| 7,229,718 B2 | 6/2007 | Yamaguchi et al. |
| 7,303,840 B2 | 12/2007 | Thackeray et al. |
| 7,312,001 B2 | 12/2007 | Kim et al. |
| 7,381,496 B2 | 6/2008 | Onnerud et al. |
| 7,416,813 B2 | 8/2008 | Fujihara et al. |
| 7,468,223 B2 | 12/2008 | Thackeray et al. |
| 7,491,471 B2 | 2/2009 | Yamaguchi et al. |
| 7,541,114 B2 | 6/2009 | Ohzuku et al. |
| 7,635,536 B2 | 12/2009 | Johnson et al. |
| 7,718,319 B2 | 5/2010 | Manthiram et al. |
| 7,754,389 B2 | 7/2010 | Yamaguchi et al. |
| 7,790,308 B2 | 9/2010 | Johnson et al. |
| 7,981,544 B2 | 7/2011 | Morishima |
| 8,092,942 B1 | 1/2012 | Chen et al. |
| 8,097,368 B2 | 1/2012 | Chiga et al. |
| 8,158,285 B2 | 4/2012 | Im et al. |
| 8,178,246 B2 | 5/2012 | Shima |
| 8,216,726 B2 | 7/2012 | Wakita et al. |
| 8,277,973 B2 | 10/2012 | Kawashima |
| 8,288,039 B2 | 10/2012 | Im et al. |
| 8,367,254 B2 | 2/2013 | Im et al. |
| 8,372,549 B2 | 2/2013 | Im et al. |
| 8,389,160 B2 | 3/2013 | Venkatachalam et al. |
| 8,394,534 B2 | 3/2013 | Lopez et al. |
| 8,415,056 B2 | 4/2013 | Koh et al. |
| 8,435,680 B2 | 5/2013 | Park et al. |
| 8,455,143 B2 | 6/2013 | Lee et al. |
| 8,535,832 B2 | 7/2013 | Kandasamy et al. |
| 8,518,525 B2 | 8/2013 | Dennes et al. |
| 8,530,099 B2 | 9/2013 | Chen et al. |
| 8,546,024 B2 | 10/2013 | Jeon et al. |
| 8,557,447 B2 | 10/2013 | Lee |
| 8,586,245 B2 | 11/2013 | Yamaguchi et al. |
| 8,668,838 B2 | 3/2014 | Takahashi et al. |
| 8,673,506 B2 | 5/2014 | Jeon et al. |
| 8,715,852 B2 | 5/2014 | Kim et al. |
| 8,715,865 B2 | 5/2014 | Xu et al. |
| 8,735,005 B2 | 5/2014 | Holstein et al. |
| 8,795,903 B2 | 8/2014 | Smart et al. |
| 8,871,384 B2 | 10/2014 | Koh et al. |
| 8,877,389 B2 | 11/2014 | Koh et al. |
| 8,945,781 B2 | 2/2015 | Chiga et al. |
| 8,946,452 B2 | 2/2015 | Dietz et al. |
| 9,093,718 B2 | 7/2015 | Dietz et al. |
| 9,105,943 B2 | 8/2015 | Jeon et al. |
| 9,246,191 B2 | 1/2016 | Jeon et al. |
| 2003/0180618 A1 | 9/2003 | Inoue et al. |
| 2003/0190529 A1 | 10/2003 | Kim et al. |
| 2004/0157133 A1 | 8/2004 | Kim et al. |
| 2005/0196670 A1 | 9/2005 | Yamaguchi et al. |
| 2006/0051671 A1 | 3/2006 | Thackeray et al. |
| 2006/0115739 A1 | 6/2006 | Yamaguchi et al. |
| 2006/0147808 A1 | 7/2006 | Xiao et al. |
| 2006/0154149 A1 | 7/2006 | Arai et al. |
| 2006/0216612 A1 | 9/2006 | Jambunathan et al. |
| 2007/0042267 A1 | 2/2007 | Kim et al. |
| 2007/0148540 A1 | 6/2007 | Chiga et al. |
| 2007/0172734 A1* | 7/2007 | Noguchi ............... H01M 4/485 429/223 |
| 2007/0178379 A1 | 8/2007 | Tamura et al. |
| 2007/0190412 A1 | 8/2007 | Chiga et al. |
| 2007/0224504 A1 | 9/2007 | Kita et al. |
| 2007/0287071 A1 | 12/2007 | Chiga et al. |
| 2008/0102375 A1 | 5/2008 | Shima |
| 2008/0131772 A1 | 5/2008 | Jambunathan et al. |
| 2008/0145763 A1 | 6/2008 | Koh et al. |
| 2008/0292971 A1 | 11/2008 | Iharu et al. |
| 2009/0142663 A1 | 6/2009 | Takeuchi et al. |
| 2009/0253044 A1 | 10/2009 | Nogi et al. |
| 2009/0253048 A1 | 10/2009 | Shima |
| 2010/0035162 A1 | 2/2010 | Chiga et al. |
| 2010/0047695 A1 | 2/2010 | Smart et al. |
| 2010/0062344 A1 | 3/2010 | Koh et al. |
| 2010/0081062 A1 | 4/2010 | Chiga et al. |
| 2010/0108934 A1 | 5/2010 | Flynn et al. |
| 2010/0119956 A1 | 5/2010 | Tokuda et al. |
| 2010/0183926 A1 | 7/2010 | Kim et al. |
| 2010/0190055 A1 | 7/2010 | Khakhalev |
| 2010/0266904 A1* | 10/2010 | Jeon ............... H01M 10/0569 429/330 |
| 2010/0266905 A1 | 10/2010 | Jeon et al. |
| 2010/0273064 A1 | 10/2010 | Jeon et al. |
| 2010/0279168 A1* | 11/2010 | Lee ............... H01M 10/0569 429/163 |
| 2011/0008684 A1 | 1/2011 | Jeon et al. |
| 2011/0111305 A1 | 5/2011 | Jeon et al. |
| 2011/0111307 A1 | 5/2011 | Koh et al. |
| 2011/0123872 A1 | 5/2011 | Koh et al. |
| 2011/0143217 A1 | 6/2011 | Arora et al. |
| 2011/0171539 A1 | 7/2011 | Patoux et al. |
| 2011/0195317 A1 | 8/2011 | Koh et al. |
| 2011/0256458 A1 | 10/2011 | Tani |
| 2011/0311866 A1 | 12/2011 | Lim et al. |
| 2012/0009485 A1 | 1/2012 | Xu |
| 2012/0136175 A1 | 5/2012 | Fuseya et al. |
| 2012/0149852 A1 | 6/2012 | Dennes et al. |
| 2012/0164519 A1 | 6/2012 | Lee et al. |
| 2012/0164542 A1 | 6/2012 | Iwaya |
| 2012/0196190 A1 | 8/2012 | Jeon et al. |
| 2012/0208093 A1 | 8/2012 | Ihara et al. |
| 2012/0219866 A1 | 8/2012 | Onuki et al. |
| 2012/0301795 A1 | 11/2012 | Kaneko et al. |
| 2012/0321965 A1 | 12/2012 | Fujikawa et al. |
| 2012/0328938 A1 | 12/2012 | Geiculescu et al. |
| 2013/0029230 A1 | 1/2013 | Park et al. |
| 2013/0029231 A1 | 1/2013 | Jeon et al. |
| 2013/0149602 A1 | 6/2013 | Luski et al. |
| 2013/0189591 A1 | 7/2013 | Nishimura et al. |
| 2013/0309564 A1 | 11/2013 | Yoshida et al. |
| 2013/0337342 A1 | 12/2013 | Hallac et al. |
| 2014/0017559 A1 | 1/2014 | Kawasaki et al. |
| 2014/0017572 A1 | 1/2014 | Uehara et al. |
| 2014/0045002 A1 | 2/2014 | Yokoyama et al. |
| 2014/0045034 A1 | 2/2014 | Kondo et al. |
| 2014/0045049 A1 | 2/2014 | Iyori et al. |
| 2014/0045050 A1 | 2/2014 | Hattori et al. |
| 2014/0045051 A1 | 2/2014 | Hattori et al. |
| 2014/0045057 A1 | 2/2014 | Tode et al. |
| 2014/0045077 A1 | 2/2014 | Minami et al. |
| 2014/0079990 A1 | 3/2014 | Yanagida et al. |
| 2014/0120415 A1 | 5/2014 | Surugo et al. |
| 2014/0141323 A1 | 5/2014 | Saruwatari et al. |
| 2014/0178772 A1 | 6/2014 | Jeong et al. |
| 2014/0227584 A1 | 8/2014 | Holstein et al. |
| 2014/0234701 A1 | 8/2014 | Tanaka et al. |
| 2014/0243561 A1 | 8/2014 | Mueller et al. |
| 2014/0248529 A1 | 9/2014 | Chen et al. |
| 2014/0302401 A1 | 10/2014 | Burkhardt et al. |
| 2014/0302402 A1 | 10/2014 | Chen et al. |
| 2014/0308578 A1 | 10/2014 | Onizuka et al. |
| 2014/0322579 A1 | 10/2014 | Mitsuhashi et al. |
| 2014/0322616 A1 | 10/2014 | Onizuka et al. |
| 2014/0329141 A1 | 11/2014 | Onizuka et al. |
| 2015/0049642 A1 | 2/2015 | Eng et al. |
| 2015/0086862 A1 | 3/2015 | Osada et al. |
| 2015/0111112 A1 | 4/2015 | Petrov et al. |
| 2015/0140444 A1 | 5/2015 | Dubois et al. |
| 2015/0303521 A1 | 10/2015 | Sasaki et al. |
| 2016/0049691 A1 | 2/2016 | Suzuki et al. |
| 2016/0087307 A1 | 3/2016 | Burkhardt et al. |

FOREIGN PATENT DOCUMENTS

| | | |
|---|---|---|
| CN | 103682440 A | 3/2014 |
| CN | 103730688 A | 4/2014 |
| CN | 103943884 A1 | 7/2014 |
| CN | 103972588 A1 | 8/2014 |
| EP | 0924788 A1 | 6/1999 |
| EP | 1890357 A1 | 2/2008 |
| EP | 2037029 A1 | 3/2009 |
| EP | 2365573 A1 | 9/2011 |
| EP | 2378602 A1 | 10/2011 |
| EP | 2535975 A1 | 12/2012 |

(56) References Cited

FOREIGN PATENT DOCUMENTS

| | | |
|---|---|---|
| EP | 2571089 A1 | 3/2013 |
| EP | 2626943 A1 | 8/2013 |
| EP | 2339684 B1 | 9/2013 |
| JP | 62290072 A | 12/1987 |
| JP | 620719 A | 1/1994 |
| JP | 08298134 * | 11/1996 |
| JP | H9-199168 A | 7/1997 |
| JP | 10116627 A | 6/1998 |
| JP | 8298134 A | 11/1998 |
| JP | 1186901 A | 3/1999 |
| JP | 2000188128 A | 7/2000 |
| JP | 2001345120 A | 12/2001 |
| JP | 2002124263 A | 4/2002 |
| JP | 3311611 A | 8/2002 |
| JP | 2003100342 A | 4/2003 |
| JP | 3444607 B2 | 9/2003 |
| JP | 2003282138 A | 10/2003 |
| JP | 2004047131 A | 2/2004 |
| JP | 2004281185 A | 7/2004 |
| JP | 2004241339 A | 8/2004 |
| JP | 2005078820 A | 3/2005 |
| JP | 2005293920 A | 10/2005 |
| JP | 2006032300 A | 2/2006 |
| JP | 2006140115 A | 6/2006 |
| JP | 2006172721 A | 6/2006 |
| JP | 2006172950 A | 6/2006 |
| JP | 2006331866 A | 7/2006 |
| JP | 2006210022 A | 8/2006 |
| JP | 2008123714 A | 5/2008 |
| JP | 2008159419 A | 7/2008 |
| JP | 2008-257988 * | 10/2008 |
| JP | 2008288144 A | 11/2008 |
| JP | 2009123465 A | 6/2009 |
| JP | 4328915 A | 9/2009 |
| JP | 2011049153 A | 3/2011 |
| JP | 2011071098 A | 4/2011 |
| JP | 2011082033 A | 4/2011 |
| JP | 2012094491 A | 5/2012 |
| JP | 5201364 B2 | 6/2013 |
| JP | 5321063 B2 | 6/2013 |
| JP | 5235437 B2 | 7/2013 |
| JP | 2015005443 A | 1/2015 |
| KR | 100908570 A | 8/2005 |
| KR | 20130134237 A | 12/2013 |
| KR | 20140083170 A | 7/2014 |
| KR | 20140106355 A | 9/2014 |
| KR | 20150106557 A | 9/2015 |
| KR | 101561646 A | 10/2015 |
| WO | 9744842 A1 | 11/1997 |
| WO | 2008079670 A1 | 7/2008 |
| WO | 2008153309 A1 | 12/2008 |
| WO | 2009022848 A1 | 2/2009 |
| WO | 2009035222 A1 | 3/2009 |
| WO | 2009038358 A1 | 3/2009 |
| WO | 2009040367 A1 | 4/2009 |
| WO | 2009084928 A2 | 9/2009 |
| WO | 2011051275 A1 | 5/2011 |
| WO | 2011099580 A1 | 8/2011 |
| WO | 2012046514 A1 | 4/2012 |
| WO | 2012132059 A1 | 10/2012 |
| WO | 2012132060 A1 | 10/2012 |
| WO | 2012132976 A1 | 10/2012 |
| WO | 2012005945 A1 | 12/2012 |
| WO | 2012170240 A1 | 12/2012 |
| WO | 2012176873 A1 | 12/2012 |
| WO | 2013010985 A1 | 1/2013 |
| WO | 2013033579 A1 | 3/2013 |
| WO | 2013033595 A1 | 3/2013 |
| WO | 2013137351 A1 | 9/2013 |
| WO | 2013180781 A1 | 12/2013 |
| WO | 2013180782 A1 | 12/2013 |
| WO | 2013180783 A1 | 12/2013 |
| WO | 2013184881 A1 | 12/2013 |
| WO | 2014080871 A1 | 5/2014 |
| WO | 2014165748 A1 | 10/2014 |
| WO | 2015046174 A1 | 4/2015 |
| WO | 2015051131 A1 | 4/2015 |
| WO | 2015051141 A1 | 4/2015 |
| WO | 2015121731 A1 | 8/2015 |
| WO | 2015179205 A1 | 11/2015 |
| WO | 2015179210 A1 | 11/2015 |
| WO | 2016025589 A1 | 2/2016 |
| WO | 2016044088 A1 | 3/2016 |

OTHER PUBLICATIONS

Bessler et al., "Boron Complexes with Dicarboxylic Acids", Zeitschrift fuer Naturforschung, Teil B: Anorganische chemie, Organische Chemie, vol. 37B, Issue 8, pp. 1020-5, Journal, 1982, CODEN: ZNBAD2, issn: 0340-5087. See also English abstract.

Henne, A.L, "A New Fluorination Method", J Am. Chem. Soc., 60(7), 1938, 1569-1571.

Hine, J. et al., "Methylenes as Intermediates in Polar Reactions. XXI. A Sulfur-containing Methylene", J. Amer. Chem. Soc. 82, 6118, 1960.

Jeong, S.-K., et al, "Surface Film Formation on a Graphite Negative Electrode in Lithium-Ion Batteries: Atomic Force Microscopy Study on the Effects of Film-Forming Additives in Propylene Carbonate Solutions", Langmuir, 2001, 17, 8281-8286.

Jung, H.M. et al., "Fluoropropane Sultone as an SEI-forming Additive that Outperforms Vinylene Carbonate", J. Mater. Chem. A, 2013, 1, 11975.

Kudryavtsev, I.Y., et al., "Catalytic Phosphorylation of Polyfluoroalkanols", Izvestiya Akademii Nausk SSSR, Seriya Khimicheskaya, 1982, 11, 2535-2540. Translation.

McMillan, R. et al., "Fluoroethylene Carbonate Electrolyte and Its Use in Lithium Iion Batteries with Graphite Anodes", J Power Sources 81-82 (1999) 20-26.

Mogi, Ryo et al, "Effects of Some Organic Additives on Lithium Deposition in Propylene Carbonate", J. Electrochem. Soc., 2002, 149(12), A1578-A1583.

Nagasubramanian, G. "Fluoro-Carbonate Solvents for Li-Ion Cells", Proc. Electrochem. Soc., 2000, 99(25), 434-439.

Nakajima, T. et al., "Effect of Fluoroesters on the Low Temperature Electrochemical Characteristics of Graphite Electrode", J Fluorine Chem 87 (1998) 221-227.

Rajeshwaran, G. G., et al, "Lewis Acid-Mediated Michaelis-Arbuzov Reaction at Room Temperature: A Facile Preparation of Arylmethyl/Heteroarylmethyl Phosphonates", Org. Lett., 2011, 13, 1270-1273.

Sasaki, Y. et al, "Physical and Electrolytic Properties of Partially Fluorinated Organic Solvents and Its Application to Secondary Lithium Batteries: Partially Fluorinated Dialkoxyethanes", ECS Transactions, 16, (35), 2009, 23-31.

Schmitz, R.W. et al, "Investigations on Novel Electrolytes, Solvents and SEI Additives for Use in Lithium-ion Batteries: Systematic Electrochemical Characterization and Detailed Analysis by Spectroscopic Methods", Progress Solid State Chem., 42 (2014) 65-84.

Sekiya, A. et al, "The Potential of Hydrofluoroethers to Replace CFCs, HCFCs, and PFCs", J Fluorine Chem, 101 (2000) 215-221.

SynQuest Laboratories, Inc. Research Chemicals Catalog, 2003, pp. 128-129.

Tarrant, P. et al, "Some Reactions of Fluoroethanes with Sodium Ethoxide", J. Am. Chem. Soc., 75, (1953), 932-934.

Von Cresce, A. et al, "Electrolyte Additive in Support of 5 V Li Ion Chemistry", J Electrochem. Soc., 158 (3), A337-A342 (2011).

Wachtler, M. et al., "The Behaviour of Graphite, Carbon Black, and Li4Ti5O12 in LiBOB-Based Electrolytes", J. Applied Electrochemistry (2006) 36: 1199-1206.

Xu et al, "Sulfone-Based Electrolytes for Lithium-Ion Batteries", Journal of the electrochemical Society, 2002, A920-A926, 149 (7).

Xu, K. "Nonaqueous Liquid Electrolytes for Lithium-Based Rechargeable Batteries", Chem. Rev., 2004, 104, 4303-4418.

Yamaki, J.-I. et al, "Thermal Studies of Fluorinated Ester as a Novel Candidate for Electrolyte Solvent of Lithium Metal Anode Rechargeable Cells", J Power Sources, 102 (2001) 288-293.

(56) References Cited

OTHER PUBLICATIONS

Yang, L. et al., "Effect of Impurities and Moisture on Lithium Bisoxalatoborate (LiBOB) Electrolyte Performance in Lithium-Ion Cells", J. Power Sources 195 (2010) 1698-1705.

Yoon, S. et al, "Sb-Mox-C (M = Al, Ti, or Mo) Nanocomposite Anodes for Lithium-Ion Batteries", Chem. Mater. 2009, 21, 3898-3904.

Zaharov et al., "A New Method of Phosphorylation of Polyfluorinated Aliphatic Alcohols", Izvestiya Akademii Nausk USSR, Seriya Khimicheskaya, No. 8, p. 1860, 1969, Translation.

Zhang, S.S., "A Review on Electrolyte Additives for Lithium-Ion Batteries", J Power Sources, 162 (2006) 1379-1394.

Zhong, G. B. et al, "Effects of Al Substitution for Ni and Mn on the Electrochemical Properties of $LiNi0.5Mn1.5O4$", Electrochimica Acta, 56(18), 2011, 6554-6561.

Lee, H. et al., "SEI Layer-Forming Additives for $LiNi0.5Mn1.5O4$/ Graphite 5V Li-ion Batteries", Electrochem. Comm. 9 (2007) 801-8069.

Liu, J. et al., "Understanding the Improved Electrochemical Performances of Fe-Substituted 5 V Spinel Cathode $LiMn1.5Ni0.5O4$", J. Phys. Chem. C, 2009, 113, 15073-15079.

Smart, M.C. et al., "Li-Ion Electrolytes Containing Ester Co-Solvents for Wide Operating Temperature Range", ECS Transactions 11(29), 2008, 99-108.

Smith, K.A. et al., "Electrolytes Containing Fluorinated Ester Co-Solvents for Low-Temperature Li-Ion Cells", ECS Transactions, 11(29), 2008, 91-98.

International Search Report and Written Opinion, Corresponding PCT International Application PCT/US2013/029825 dated May 14, 2013.

International Search Report and Written Opinion, Related PCT International Application PCT/US2013/029815 dated Jun. 6, 2013.

International Search Report and Written Opinion, Related PCT International Application PCT/US2013/029818 dated May 14, 2013.

International Search Report and Written Opinion, Related PCT International Application PCT/US2012/053415 dated Jan. 22, 2013.

International Search Report and Written Opinion, Related PCT International Application PCT/US2014/058845 dated Dec. 11, 2014.

International Search Report and Written Opinion, Related PCT International Application PCT/US2014/058859 dated Feb. 25, 2015.

International Search Report and Written Opinion, Related PCT International Application PCT/US2014/032961 dated Jul. 15, 2014.

International Search Report and Written Opinion, Related PCT International Application PCT/US2015/030785 dated Jul. 16, 2015.

International Search Report and Written Opinion, Related PCT International Application PCT/US2015/030807 dated Jul. 17, 2015.

International Search Report and Written Opinion, Related PCT International Application PCT/US2015/044844 dated Dec. 22, 2015.

International Search Report and Written Opinion, Related PCT International Application PCT/US2015/049642 dated Dec. 22, 2015.

International Search Report and Written Opinion, Related PCT International Application PCT/US2012/053439 dated Jan. 22, 2013.

* cited by examiner

FLUORINATED ELECTROLYTE COMPOSITIONS

This application claims priority under 35 U.S.C. § 119(e) from, and claims the benefit of, U.S. Provisional Application No. 61/654,190 filed Jun. 1, 2012, which is by this reference incorporated in its entirety as a part hereof for all purposes.

TECHNICAL FIELD

The disclosure hereof relates to electrolyte compositions containing novel fluorine-containing carboxylic acid ester solvents, which are useful in electrochemical cells, such as lithium ion batteries.

BACKGROUND

Carbonate compounds are currently used as electrolyte solvents for non-aqueous batteries containing electrodes made from alkali metals, alkaline earth metals, or compounds comprising these metals, for example lithium ion batteries. Current lithium ion battery electrolyte solvents typically contain one or more linear carbonates, such as ethyl methyl carbonate, dimethyl carbonate, or diethylcarbonate; and a cyclic carbonate, such as ethylene carbonate. However, at battery voltages above 4.4 V these electrolyte solvents can decompose, which can result in a loss of battery performance. Additionally, there are safety concerns with the use of these electrolyte solvents because of their low boiling point and high flammability.

To overcome the limitations of commonly used non-aqueous electrolyte solvents, various fluorine-containing carboxylic acid ester electrolyte solvents have been investigated for use in lithium ion batteries (see, for example, Nakamura et al in JP 4/328,915-B2, JP 3/444,607-B2, and U.S. Pat. No. 8,097,368). Although these fluorine-containing carboxylic acid ester electrolyte solvents can be used in lithium ion batteries having high voltage cathodes, such the 4 V spinel $LiMn_2O_4$ cathode, cycling performance can be limited, particularly at high temperatures.

Despite the efforts in the art as described above, a need remains for electrolyte solvents, and compositions thereof, that will have improved cycling performance at high temperature when used in a lithium ion battery, particularly such a battery that operates at high voltage (i.e. up to about 5 V).

SUMMARY

In one embodiment, there is provided herein an electrolyte composition comprising (a) at least one electrolyte salt, and (b) at least one fluorine-containing carboxylic acid ester represented by the formula $R^1$—C(O)O—$R^2$, wherein
$R^1$ is $CH_3CH_2$— and $R^2$ is —$CH_2CHF_2$,
$R^1$ is $CH_3$— and $R^2$ is —$CH_2CH_2CHF_2$,
$R^1$ is $CH_3CH_2$— and $R^2$ is —$CH_2CH_2CHF_2$,
$R^1$ is $CHF_2CH_2CH_2$— and $R^2$ is —$CH_2CH_3$, or
$R^1$ is $CHF_2CH_2$— and $R^2$ is —$CH_2CH_3$.

In another embodiment of the subject matter hereof, there is provided an electrochemical cell comprising:
(a) a housing;
(b) an anode and a cathode disposed in said housing and in ionically conductive contact with one another;
(c) an electrolyte composition disposed in said housing and providing an ionically conductive pathway between said anode and said cathode, wherein the electrolyte composition comprises:
(i) at least one electrolyte salt; and
(ii) at least one fluorine-containing carboxylic acid ester represented by the formula $R^1$—C(O)O—$R^2$, wherein
$R^1$ is $CH_3CH_2$— and $R^2$ is —$CH_2CHF_2$,
$R^1$ is $CH_3$— and $R^2$ is —$CH_2CH_2CHF_2$,
$R^1$ is $CH_3CH_2$— and $R^2$ is —$CH_2CH_2CHF_2$,
$R^1$ is $CHF_2CH_2CH_2$— and $R^2$ is —$CH_2CH_3$, or
$R^1$ is $CHF_2CH_2$— and $R^2$ is —$CH_2CH_3$; and
(d) a porous separator between said anode and said cathode.

DETAILED DESCRIPTION

As used above and throughout the description of the invention, the following terms, unless otherwise indicated, shall be defined as follows:

The term "electrolyte composition" as used herein, refers to a chemical composition suitable for use as an electrolyte in an electrochemical cell. An electrolyte composition typically comprises at least one solvent and at least one electrolyte salt.

The term "electrolyte salt" as used herein, refers to an ionic salt that is at least partially soluble in the solvent of the electrolyte composition and that at least partially dissociates into ions in the solvent of the electrolyte composition to form a conductive electrolyte composition.

The term "anode" refers to the electrode of an electrochemical cell, at which oxidation occurs. In a galvanic cell, such as a battery, the anode is the negatively charged electrode. In a secondary (i.e. rechargeable) battery, the anode is the electrode at which oxidation occurs during discharge and reduction occurs during charging.

The term "cathode" refers to the electrode of an electrochemical cell, at which reduction occurs. In a galvanic cell, such as a battery, the cathode is the positively charged electrode. In a secondary (i.e. rechargeable) battery, the cathode is the electrode at which reduction occurs during discharge and oxidation occurs during charging.

The term "lithium ion battery" refers to a type of rechargeable battery in which lithium ions move from the anode to the cathode during discharge, and from the cathode to the anode during charge.

Disclosed herein are electrolyte compositions comprising novel fluorine-containing carboxylic acid esters. The electrolyte compositions are useful in electrochemical cells, particularly lithium ion batteries.

Specifically, the electrolyte compositions disclosed herein comprise at least one fluorine-containing carboxylic acid ester represented by the formula $R^1$—C(O)O—$R^2$, wherein
$R^1$ is $CH_3CH_2$— and $R^2$ is —$CH_2CHF_2$,
$R^1$ is $CH_3$— and $R^2$ is —$CH_2CH_2CHF_2$,
$R^1$ is $CH_3CH_2$— and $R^2$ is —$CH_2CH_2CHF_2$,
$R^1$ is $CHF_2CH_2CH_2$— and $R^2$ is —$CH_2CH_3$, or
$R^1$ is $CHF_2CH_2$— and $R^2$ is —$CH_2CH_3$.

In one embodiment, the fluorine-containing carboxylic acid ester is $CH_3CH_2$—C(O)O—$CH_2CHF_2$ (2,2-difluoroethyl propionate). In another embodiment, the fluorine-containing carboxylic acid ester is $CH_3$—C(O)O—$CH_2CH_2CHF_2$ (3,3-difluoropropyl acetate).

The fluorine-containing carboxylic acid esters disclosed herein can be prepared using methods known in the art. For example, acetyl chloride may be reacted with 2,2-difluoroethanol (with or without a basic catalyst) to form 2,2-difluoroethyl acetate. Additionally, 2,2-difluoroethyl acetate and 2,2-difluoroethyl propionate may be prepared using the method described by Wiesenhofer et al (WO 2009/040367 A1, Example 5). Alternatively, 2,2-difluoroethyl acetate and 2,2-difluoroethyl propionate can be prepared using the method described in the examples herein below. Other fluorine-containing carboxylic acid esters may be prepared using the same method using different starting carboxylate salts. It is desirable to purify the fluorine-containing carboxylic acid esters to a purity level of at least about 99.9%, more particularly at least about 99.99%. These fluorinated esters may be purified using distillation methods such as vacuum distillation or spinning band distillation.

The electrolyte compositions disclosed herein also contain at least one electrolyte salt. Suitable electrolyte salts include without limitation lithium hexafluorophosphate ($LiPF_6$),
lithium tris(pentafluoroethyl)trifluorophosphate ($LiPF_3(C_2F_5)_3$),
lithium bis(trifluoromethanesulfonyl)imide,
lithium bis (perfluoroethanesulfonyl)imide,
lithium (fluorosulfonyl) (nonafluorobutanesulfonyl) imide,
lithium bis(fluorosulfonyl)imide,
lithium tetrafluoroborate,
lithium perchlorate,
lithium hexafluoroarsenate,
lithium trifluoromethanesulfonate,
lithium tris (trifluoromethanesulfonyl)methide,
lithium bis(oxalato)borate,
lithium difluoro(oxalato)borate,
$Li_2B_{12}F_{12-x}H_x$ where x is equal to 0 to 8, and
mixtures of lithium fluoride and anion receptors such as $B(OC_6F_5)_3$.

Mixtures of two or more of these or comparable electrolyte salts may also be used. In one embodiment, the electrolyte salt is lithium hexafluorophosphate. The electrolyte salt can be present in the electrolyte composition in an amount of about 0.2 to about 2.0 M, more particularly about 0.3 to about 1.5 M, and more particularly about 0.5 to about 1.2 M.

The electrolyte composition disclosed herein may further comprise at least one co-solvent. Examples of suitable co-solvents include without limitation one or more carbonates. Suitable carbonates include ethyl methyl carbonate, dimethyl carbonate, diethyl carbonate, ethylene carbonate, propylene carbonate, vinylethylene carbonate, fluoroethylene carbonate, 2,2,2-trifluoroethyl carbonate, and methyl 2,2,3,3-tetrafluoropropyl carbonate. It is desirable to use a co-solvent that is battery grade or has a purity level of at least about 99.9%, and more particularly at least about 99.99%. In one embodiment, the co-solvent is ethylene carbonate.

In the electrolyte compositions disclosed herein, the fluorine-containing carboxylic acid esters and the co-solvent may be combined in various ratios to form a solvent mixture, depending on the desired properties of the electrolyte composition. In one embodiment, the fluorinated carboxylic acid ester comprises about 10% to about 90% by weight of the solvent mixture. In another embodiment, the fluorinated carboxylic acid ester comprises about 40% to about 90% by weight of the solvent mixture. In another embodiment, the fluorinated carboxylic acid ester comprises about 50% to about 80% by weight of the solvent mixture. In another embodiment, the fluorinated carboxylic acid ester comprises about 60% to about 80% by weight of the solvent mixture. In another embodiment, the fluorinated carboxylic acid ester a comprises about 65% to about 75% by weight of the solvent mixture. In another embodiment, the fluorinated carboxylic acid ester 70% by weight of the solvent mixture.

In another embodiment, the electrolyte composition comprises a solvent mixture containing the fluorinated carboxylic acid ester $CH_3CH_2$—$C(O)O$—$CH_2CHF_2$ and ethylene carbonate, wherein $CH_3CH_2$—$C(O)O$—$CH_2CHF_2$ comprises about 50% to about 80% by weight of the solvent mixture. In another embodiment, the nonaqueous electrolyte composition contains a solvent mixture of the fluorinated carboxylic acid ester $CH_3CH_2$—$C(O)O$—$CH_2CHF_2$ and ethylene carbonate, wherein $CH_3CH_2$—$C(O)O$—$CH_2CHF_2$ comprises about 70% by weight of the solvent mixture.

In another embodiment, the electrolyte composition comprises a solvent mixture containing the fluorinated carboxylic acid ester $CH_3$—$C(O)O$—$CH_2CH_2CHF_2$ and ethylene carbonate, wherein $CH_3$—$C(O)O$—$CH_2CH_2CHF_2$ comprises about 50% to about 80% by weight of the solvent mixture. In another embodiment, the nonaqueous electrolyte composition contains a solvent mixture of the fluorinated carboxylic acid ester $CH_3$—$C(O)O$—$CH_2CH_2CHF_2$ and ethylene carbonate, wherein $CH_3$—$C(O)O$—$CH_2CH_2CHF_2$ comprises about 70% by weight of the solvent mixture.

The electrolyte composition disclosed herein may also contain at least one film-forming additive. Suitable film-forming additives include without limitation fluoroethylene carbonate (also referred to herein as 4-fluoro-1,3-dioxolan-2-one, CAS No. 114435-02-8) and its derivatives,
ethylene sulfate and its derivatives,
vinyl ethylene carbonate and its derivatives,
vinylene carbonate and its derivatives,
maleic anhydride and its derivatives, and
vinyl acetate.

In one embodiment, the film-forming additive is fluoroethylene carbonate.

The film-forming additive, if used, is generally present in an amount of about 0.01% to about 5%, more particularly about 0.1% to about 2%, and more particularly about 0.5% to about 1.5% by weight of the total electrolyte composition. It is desirable to purify these film-forming additives to a purity level of at least about 99.0%, more particularly at least about 99.9%. Purification may be done using known methods, as described above. These additives are available commercially; fluoroethylene carbonate, for example, is available from companies such as China LangChem INC. (Shanghai, China) and MTI Corp. (Richmond, Calif.).

In another embodiment, the invention provides an electrochemical cell comprising a housing, an anode and a cathode disposed in the housing and in ionically conductive contact with one another, an electrolyte composition, as described above, providing an ionically conductive pathway between the anode and the cathode, and a porous or microporous separator between the anode and the cathode. The housing may be any suitable container to house the electrochemical cell components. The anode and the cathode may be comprised of any suitable conducting material depending on the type of electrochemical cell. Suitable examples of anode materials include without limitation lithium metal, lithium metal alloys, lithium titanate, aluminum, platinum, palladium, graphite, transition metal oxides, and lithiated tin oxide. Suitable examples of cathode materials include without limitation graphite, aluminum, platinum, palladium, electroactive transition metal oxides comprising lithium or sodium, indium tin oxide, and conducting polymers such as polypyrrole and polyvinylferrocene.

The porous separator serves to prevent short circuiting between the anode and the cathode. The porous separator typically consists of a single-ply or multi-ply sheet of a microporous polymer such as polyethylene, polypropylene, or a combination thereof. The pore size of the porous separator is sufficiently large to permit transport of ions, but small enough to prevent contact of the anode and cathode either directly or from particle penetration or dendrites which can from on the anode and cathode.

In another embodiment, the electrochemical cell is a lithium ion battery. Suitable cathode materials for a lithium ion battery include without limitation electroactive transition metal oxides comprising lithium, such as $LiCoO_2$, $LiNiO_2$, $LiMn_2O_4$, or $LiV_3O_8$; oxides of layered structure such as $LiNi_xMn_yCo_zO_2$ where x+y+z is about 1, $LiCo_{0.2}Ni_{0.2}O_2$, $LiFePO_4$, $LiMnPO_4$, $LiCoPO_4$, $LiNi_{0.5}Mn_{1.5}O_4$, $LiVPO_4F$; mixed metal oxides of cobalt, manganese, and nickel such as those described in U.S. Pat. No. 6,964,828 (Lu) and U.S. Pat. No. 7,078,128 (Lu); nanocomposite cathode compositions such as those described in U.S. Pat. No. 6,680,145 (Obrovac); lithium-rich layered-layered composite cathodes such as those described in U.S. Pat. No. 7,468,223; and cathodes such as those described in U.S. Pat. No. 7,718,319 and the references therein.

In another embodiment, the cathode in the lithium ion battery hereof comprises a cathode active material exhibiting greater than 30 mAh/g capacity in the potential range greater than 4.6 V versus a $Li/Li^+$ reference electrode. One example of such a cathode is a stabilized manganese cathode comprising a lithium-containing manganese composite oxide having a spinel structure as cathode active material. The lithium-containing manganese composite oxide in a cathode suitable for use herein comprises oxides of the formula $Li_xNi_yM_zMn_{2-y-z}O_{4-d}$, wherein x is 0.03 to 1.0; x changes in accordance with release and uptake of lithium ions and electrons during charge and discharge; y is 0.3 to 0.6; M comprises one or more of Cr, Fe, Co, Li, Al, Ga, Nb, Mo, Ti, Zr, Mg, Zn, V, and Cu; z is 0.01 to 0.18; and d is 0 to 0.3. In one embodiment in the above formula, y is 0.38 to 0.48, z is 0.03 to 0.12, and d is 0 to 0.1. In one embodiment in the above formula, M is one or more of Li, Cr, Fe, Co and Ga. Stabilized manganese cathodes may also comprise spinel-layered composites which contain a manganese-containing spinel component and a lithium rich layered structure, as described in U.S. Pat. No. 7,303,840.

A cathode active material suitable for use herein can be prepared using methods such as the hydroxide precursor method described by Liu et al (*J. Phys. Chem. C* 13:15073-15079, 2009). In that method, hydroxide precursors are precipitated from a solution containing the required amounts of manganese, nickel and other desired metal(s) acetates by the addition of KOH. The resulting precipitate is oven-dried and then fired with the required amount of $LiOH.H_2O$ at about 800 to about 950° C. in oxygen for 3 to 24 hours, as described in detail in the examples herein. Alternatively, the cathode active material can be prepared using a solid phase reaction process or a sol-gel process as described in U.S. Pat. No. 5,738,957 (Amine).

A cathode, in which the cathode active material is contained, suitable for use herein may be prepared by methods such as mixing an effective amount of the cathode active material (e.g. about 70 wt % to about 97 wt %), a polymer binder, such as polyvinylidene difluoride, and conductive carbon in a suitable solvent, such as N-methylpyrrolidone, to generate a paste, which is then coated onto a current collector such as aluminum foil, and dried to form the cathode.

A lithium ion battery as disclosed herein can further contain an anode, which comprises an anode active material that is capable of storing and releasing lithium ions. Examples of suitable anode active materials include without limitation lithium alloys such as lithium-aluminum alloy, lithium-lead alloy, lithium-silicon alloy, lithium-tin alloy and the like; carbon materials such as graphite and mesocarbon microbeads (MCMB); phosphorus-containing materials such as black phosphorus, $MnP_4$ and $CoP_3$; metal oxides such as $SnO_2$, SnO and $TiO_2$; and lithium titanates such as $Li_4Ti_5O_{12}$ and $LiTi_2O_4$. In one embodiment, the anode active material is lithium titanate or graphite.

An anode can be made by a method similar to that described above for a cathode wherein, for example, a binder such as a vinyl fluoride-based copolymer is dissolved or dispersed in an organic solvent or water, which is then mixed with the active, conductive material to obtain a paste. The paste is coated onto a metal foil, preferably aluminum or copper foil, to be used as the current collector. The paste is dried, preferably with heat, so that the active mass is bonded to the current collector. Suitable anode active materials and anodes are available commercially from companies such as Hitachi NEI Inc. (Somerset, N.J.), and Farasis Energy Inc. (Hayward, Calif.).

A lithium ion battery as disclosed herein also contains a porous separator between the anode and cathode. The porous separator serves to prevent short circuiting between the anode and the cathode. The porous separator typically consists of a single-ply or multi-ply sheet of a microporous polymer such as polyethylene, polypropylene, polyamide or polyimide, or a combination thereof. The pore size of the porous separator is sufficiently large to permit transport of ions to provide ionically conductive contact between the anode and cathode, but small enough to prevent contact of the anode and cathode either directly or from particle penetration or dendrites which can from on the anode and cathode. Examples of porous separators suitable for use herein are disclosed in U.S. application Ser. No. 12/963,927 (filed 9 Dec. 2010, U.S. Patent Application Publication No. 2012/0149852), which is by this reference incorporated in its entirety as a part hereof for all purposes.

The housing of the lithium ion battery hereof may be any suitable container to house the lithium ion battery components described above. Such a container may be fabricated in the shape of small or large cylinder, a prismatic case or a pouch.

The lithium ion battery hereof may be used for grid storage or as a power source in various electronically-powered or -assisted devices ("Electronic Device") such as a transportation device (including a motor vehicle, automobile, truck, bus or airplane), a computer, a telecommunications device, a camera, a radio or a power tool.

EXAMPLES

The subject matter disclosed herein is further defined in the following examples. It should be understood that these examples, while describing various features of certain particular embodiments of some of the inventions hereof, are given by way of illustration only.

The meaning of abbreviations used is as follows: "g" means gram(s), "mg" means milligram(s), "µg" means microgram(s), "L" means liter(s), "mL" means milliliter(s), "mol" means mole(s), "mmol" means millimole(s), "M" means molar concentration, "wt %" means percent by weight, "mm" means millimeter(s), "ppm" means parts per million, "h" means hour(s), "min" means minute(s),"Hz" means hertz, "mS" means millisiemen(s), "mA" mean milliamp(s), "mAh/g" mean milliamp hour(s) per gram, "V" means volt(s), "xC" refers to a constant current that can fully charge/discharge the cathode in 1/x hours, "SOC" means state of charge, "SEI" means solid electrolyte interface formed on the surface of the electrode material, "kPa" means kilopascal(s), "rpm" means revolutions per minute, "psi" means pounds per square inch.

Materials and Methods:
Preparation of 2,2-Difluoroethyl Acetate

Potassium acetate (Aldrich, 99%) was dried at 100° C. under a vacuum of 0.5-1 mm of Hg (66.7-133 Pa) for 4 to 5 h. The dried material had a water content of less than 5 ppm, as determined by Karl Fischer titration. In a dry box, 212 g (2.16 mol, 8 mol % excess) of the dried potassium acetate was placed into a 1.0-L, 3 neck round bottom flask containing a heavy magnetic stir bar. The flask was removed from the dry box, transferred into a fume hood, and equipped with a thermocouple well, a dry-ice condenser, and an addition funnel.

Sulfolane (500 mL, Aldrich, 99%, 600 ppm of water as determined by Karl Fischer titration) was melted and added to the 3 neck round bottom flask as a liquid under a flow of nitrogen. Agitation was started and the temperature of the reaction mixture was brought to about 100° C. $HCF_2CH_2Br$ (290 g, 2 mol, E.I. du Pont de Nemours and Company, 99%) was placed in the addition funnel and was slowly added to the reaction mixture. The addition was mildly exothermic and the temperature of the reaction mixture rose to 120-130° C. in 15-20 min after the start of the addition. The addition of $HCF_2CH_2Br$ was kept at a rate which maintained the internal temperature at 125-135° C. The addition took about 2-3 h. The reaction mixture was agitated at 120-130° C. for an additional 6 h (typically the conversion of bromide at this point was about 90-95%). Then, the reaction mixture was cooled down to room temperature and was agitated overnight. Next morning, heating was resumed for another 8 h.

At this point the starting bromide was not detectable by NMR and the crude reaction mixture contained 0.2-0.5% of 1,1-difluoroethanol. The dry-ice condenser on the reaction flask was replaced by a hose adapter with a Teflon® valve and the flask was connected to a mechanical vacuum pump through a cold trap (−78° C., dry-ice/acetone). The reaction product was transferred into the cold trap at 40-50° C. under a vacuum of 1-2 mm Hg (133 to 266 Pa). The transfer took about 4-5 h and resulted in 220-240 g of crude $HCF_2CH_2OC(O)CH_3$ of about 98-98.5% purity, which was contaminated by a small amount of $HCF_2CH_2Br$ (about 0.1-0.2%), $HCF_2CH_2OH$ (0.2-0.8%), sulfolane (about 0.3-0.5%) and water (600-800 ppm). Further purification of the crude product was carried out using spinning band distillation at atmospheric pressure. The fraction having a boiling point between 106.5-106.7° C. was collected and the impurity profile was monitored using GC/MS (capillary column HP5MS, phenyl-methyl siloxane, Agilent19091S-433, 30.m, 250 μm, 0.25 μm; carrier gas—He, flow rate 1 mL/min; temperature program : 40° C., 4 min, temp. ramp 30° C./min, 230° C., 20 min). Typically, the distillation of 240 g of crude product gave about 120 g of $HCF_2CH_2OC(O)CH_3$ of 99.89% purity, (250-300 ppm $H_2O$) and 80 g of material of 99.91% purity (containing about 280 ppm of water). Water was removed from the distilled product by treatment with 3A molecular sieves, until water was not detectable by Karl Fischer titration (i.e., <1 ppm).

Preparation of 2,2-Difluoroethyl Propionate.

Potassium propionate (Aldrich, 99%) was dried at 100° C. under a vacuum of 0.5-1 mm of Hg (66.7-133 Pa) for 4 to 5 h. The dried material had a water content of less than 5 ppm, as determined by Karl Fischer titration. In a dry box, 75 g (0.67 mol, 10 mol % excess) of the dried potassium propionate was placed into a 500 mL, 3 neck round bottom flask containing a heavy magnetic stir bar. The flask was removed from the dry box, transferred into a fume hood, and equipped with a thermocouple well, a dry-ice condenser, and an additional funnel. Sulfolane (300 mL, Aldrich 99%, 600 ppm of water as determined by Karl Fischer titration) was melted and added to the 3 neck round bottom flask as a liquid under a flow of nitrogen. Agitation was started and the temperature of the reaction mixture was brought to about 100° C. $HCF_2CH_2Br$ (87 g, 0.6 mol, E.I. du Pont de Nemours and Company, 99%) was placed in the addition funnel and was slowly added to the reaction mixture. The addition was mildly exothermic and the temperature rose to 120-130° C. in 15-20 min after the start of the addition. The addition of $HCF_2CH_2Br$ was kept at a rate which maintained the internal temperature at 125-135° C. The addition took about 2-3 h. The reaction mixture was agitated at 120-130° C. for an additional 6 h (typically the conversion of bromide at this point was about 90-95%). Then, the reaction mixture was cooled down to room temperature and was agitated overnight. Next morning, heating was resumed for another 8 h.

At this point, the starting bromide and 1,1-difluoroethanol were not detectable in the crude reaction mixture by NMR. The dry-ice condenser on the reaction flask was replaced by a hose adapter with a Teflon® valve and the flask was connected to a mechanical vacuum pump through a cold trap (−78° C., dry-ice/acetone). The reaction product was transferred into the cold trap at 40- 50° C. under a vacuum of 1-2 mm Hg (133 to 266 Pa). The transfer took about 3 h and resulted in 48 g of crude $HCF_2CH_2OC(O)C_2H_5$ of about 98% purity. Further purification of the crude product was carried out using spinning band distillation at atmospheric pressure. The fraction having a boiling point between 120.3-120.6° C. was collected and the impurity profile was monitored using GC/MS (capillary column HPSMS, phenyl-methyl siloxane, Agilent 19091S-433, 30 m, 250 μm, 0.25 μm; carrier gas—He, flow rate 1 mL/min; temperature program: 40° C., 4 min, temp. ramp 30° C./min, 230° C., 20 min). The crude product (43 g) had a purity of 99.91% and contained about 300 ppm of water. Water was removed from the product by treatment with 3A molecular sieves, until water was not detectable by Karl Fischer titration (i.e., <1 ppm).

$HCF_2CH_2OC(O)C_2H_5$: $^1H$ NMR ($CDCl_3$) : 1.10 (3H.t), 2.35 (2H, q), 4.21(2H, td), 5.87(1H, tt) ppm; $^{19}F$ NMR ($CDCl_3$): −125.68 (dt, 56.6, 13.7 Hz) ppm, GS/MS (m/z) : 138($M^+$, $C_5H_8F_2O_2^+$)

Preparation of $LiMn_{1.5}Ni_{0.42}Fe_{0.08}O_4$ Cathode Active Material

For $LiMn_{1.5}Ni_{0.42}Fe_{0.08}O_4$, 401 g manganese (II) acetate tetrahydrate (Aldrich 63537), 115 g nickel (II) acetate tetrahydrate (Aldrich 72225) and 15.2 g iron (II) acetate anhydrous (Alfa Aesar 31140) were weighed into bottles on a balance then dissolved in 5 L of deionized water. KOH pellets were dissolved in 10 L of deionized water to produce a 3.0 M solution inside a 30 L reactor. The acetate solution was transferred to an addition funnel and dripped into the rapidly stirred reactor to precipitate the mixed hydroxide material. Once all 5 L of the acetate solution was added to the reactor stirring was continued for 1 h. Then stirring was stopped and the precipitate was allowed to settle overnight. After settling the liquid was removed from the reactor and 15 L of fresh deionized water was added. The contents of the reactor were stirred, allowed to settle again, and liquid removed. This rinse process was repeated. Then the precipitate was transferred to two (split evenly) coarse glass frit filtration funnels covered with Dacron® paper. The solids were rinsed with deionized water until the filtrate pH reached 6 (pH of deionized rinse water), and a further 20 L of deionized water was added to each filter cake. Finally the cakes were dried in a vacuum oven at 120° C. overnight. The yield at this point was typically 80-90%.

The hydroxide precipitate was next ground and mixed with lithium carbonate. This step was done in 60 g batches using a Fritsche Pulverisette automated mortar and pestle. For each batch the hydroxide mixture was weighed, then ground alone for 5 minutes in the Pulveresette. Then a stoichiometric amount with small excess of lithium carbonate was added to the system. For 53 g of hydroxide 11.2 g of lithium carbonate was added. Grinding was continued for a total of 60 minutes with stops every 10-15 minutes to scrape the material off of the surfaces of the mortar and pestle with a sharp metal spatula. If humidity caused the material to form clumps, it was sieved through a 40 mesh screen once during grinding, then again following grinding.

The ground material was fired in air in a box furnace inside shallow rectangular alumina trays. The trays were 158 mm by 69 mm in size, and each held about 60 g of material. The firing procedure consisted of ramping from room temperature to 900° C. in 15 hours, holding at 900° C. for 12 hours, then cooling to room temperature in 15 hours.

Preparation of Nonaqueous Electrolyte Composition Comprising 2,2-Difluoroethyl Acetate (DFEA) and Ethylene Carbonate (EC)

2,2-Difluoroethyl acetate, prepared as described above, was purified by spinning band distillation twice to 99.992% purity, as determined by gas chromatography using a mass spectrometric detector. The purified 2,2-difluoroethyl acetate and ethylene carbonate (anhydrous, Novolyte, Independence, OH) were mixed together to make 15 mL of total solution in a 70:30 w/w ratio, and the resulting mixture was dried over 3A molecular sieves (Sigma-Aldrich, Milwaukee, WI). After drying, the water content was determined to be 0.5 ppm using Karl Fischer titration. The solution was syringe filtered through a 0.2 μm PTFE syringe filter. To 15.0 mL of the resulting solution was added 2.28 g of lithium hexafluorophosphate (battery grade, Novolyte) and the mixture was shaken for a few minutes until all the solid was dissolved.

Preparation of Nonaqueous Electrolyte Composition Comprising 2,2-Difluoroethyl Propionate (DFEP)

2,2-Difluoroethyl propionate, prepared as described above, was purified by spinning band distillation twice to 99.990% purity, as determined by gas chromatography using a mass spectrometric detector. The purified 2,2-difluoroethyl propionate was dried over 3A molecular sieves (Sigma-Aldrich, Milwaukee, Wis.). After drying, the water content was determined to be <0.5 ppm using Karl Fischer titration. The solution was syringe filtered through a 0.2 μm PTFE syringe filter. To the resulting DFEP (7.0 mL) was added a sufficient amount of lithium hexafluorophosphate (battery grade, Novolyte) to give a concentration of 1.0 M. The mixture was shaken for a few minutes until all the solid was dissolved.

Preparation of Nonaqueous Electrolyte Composition Comprising 2,2-Difluoroethyl Propionate (DFEP) and Ethylene Carbonate (EC)

2,2-Difluoroethyl propionate, prepared as described above, was purified by spinning band distillation twice to 99.990% purity, as determined by gas chromatography using a mass spectrometric detector. The purified 2,2-difluoroethyl acetate and ethylene carbonate (anhydrous, Novolyte, Independence, Ohio) were mixed together to make 9.0 mL of total solution in a 70:30 w/w ratio, and the resulting mixture was dried over 3A molecular sieves (Sigma-Aldrich, Milwaukee, Wis.). After drying, the water content was determined to be <0.5 ppm using Karl Fischer titration. The solution was syringe filtered through a 0.2 μm PTFE syringe filter. To 9.0 mL of the resulting solution was added lithium hexafluorophosphate (battery grade, Novolyte) to give a concentration of 1.0 M. The mixture was shaken for a few minutes until all the solid was dissolved.

Preparation of an Iron-Doped, Lithium, Nickel, Manganese Oxide (Fe-LNMO) Cathode The following is a description of a representative preparation of an Fe-LNMO cathode. The cathode active material $LiMn_{1.5}Ni_{0.42}Fe_{0.08}O_4$, prepared as describe above, was ground for ten minutes using an agate mortar and pestle and then passed through a 75 μm sieve. Particle size was measured to be 18 μm (d90). The sized cathode active material (1.240 g), 0.155 g of Denka black (acetylene black, DENKA Corp., Japan), 1.292 g of polyvinylidene difluoride (PVDF) solution (12 wt % in N-methylpyrrolidone (NMP), Kureha America Inc., New York, N.Y., KFL#1120), and an additional 2.313 g of anhydrous NMP (Sigma -Aldrich, Milwaukee, Wis.) were mixed first using a planetary centrifugal mixer (THINKY ARE-310, THINKY Corp., Japan) at 2,000 rpm, a shear mixer (VWR, Wilmington, N.C.), and then a planetary centrifugal mixer at 2,000 rpm to form a uniform slurry. The slurry was coated on 25 μm thick aluminum foil using a doctor blade, dried on a hot plate at 100° C. for five to seven minutes, then in a vacuum oven at 100° C. for five to seven minutes. The resulting 25-mm wide cathode was placed on a 125 μm thick brass sheet and two 38 mm wide brass shim strips of 87 μm thickness were placed on either side of the cathode to control the gap thickness in the calender. The electrode and shims were covered with a second 125 μm thick brass sheet, and the assembly was passed through a calender three times using 100 mm diameter steel rolls heated to 125° C. with a nip force of 154, 205, and 356 kg, respectively. The cathode was further dried in a vacuum oven at 90° C. at −25 inches of Hg (−85 kPa) for 15 h.

Preparation of a Lithium Titanate (LTO) Anode

The following is a description of a representative preparation of an LTO anode. The LTO anode active material, $Li_4Ti_5O_{12}$ (NEI Nanomyte™ BE-10, Somerset, N.J.), was ground for ten minutes using an agate mortar and pestle. The ground anode active material (3.168 g), 0.396 g of Super P Li carbon (Timcal, Switzerland), 3.300 g of polyvinylidene difluoride (PVDF) solution (12 wt % in N-methylpyrrolidone (NMP), Kureha America Inc., New York, N.Y., KFL#1120), and an additional 4.136 g of NMP were mixed first using a planetary centrifugal mixer (THINKY ARE-310, THINKY Corp., Japan) at 2,000 rpm, a shear mixer (VWR, Wilmington, N.C.), and then a planetary centrifugal mixer at 2,000 rpm to form a uniform slurry. The slurry was coated on copper foil using a doctor blade, and dried first on a hot plate at 100° C. for five to seven minutes, then in a vacuum oven at 100° C. for five to seven minutes. The resulting electrode was calendered at 125° C. to constant thickness as previously described.

Fabrication of LTO|electrolyte|Fe-LNMO Full Cells

The following is a description of a representative preparation of full cells containing an Fe-LNMO cathode, an LTO anode and an electrolyte composition. Circular anodes 15 mm in diameter and cathodes 14 mm in diameter were punched out, placed in a heater in the antechamber of a glove box, further dried under vacuum at 90° C. for 15 h, and brought in to an argon glove box (Vacuum Atmospheres, Hawthorne, Calif., Nexus purifier). Nonaqueous electrolyte lithium-ion CR2032 coin cells were prepared for electrochemical evaluation. The coin cell parts (stainless steel case, two spacers, wave spring, lid, and polypropylene gasket)

and coin cell crimper were obtained from Hohsen Corp (Osaka, Japan). An Fe-LNMO cathode, prepared as described above, a Celgard® separator 2325 (Celgard, LLC. Charlotte, N.C.), an LTO anode, prepared as described above, and a few drops of the nonaqueous electrolyte composition of interest, were assembled to form the LTO/Fe-LNMO full cells.

Comparative Example 1 and Working Examples 1-2

High Temperature Performance of Full Cells

Full cells, containing the anode, cathode, and nonaqueous electrolyte shown in Table 1, were cycled using a commercial battery tester (Series 4000, Maccor, Tulsa, OK) in a temperature-controlled chamber at 55° C. using voltage limits of 1.9 to 3.4 V. The constant-current charge and discharge currents for the first two cycles were 12 mA/g of LNMO (about 0.1C rate), and subsequent cycles were carried out at 120 mA/g of LNMO for 29 cycles (about 1C rate) then one cycle at 12 mA/g then repeated until T80 was reached. T80 is defined as the number of cycles before the cell's discharge capacity has been reduced to 80% of the initial discharge capacity of the third charge-discharge cycle (first cycle at the 1C rate). The cycle number at which T80 was reached is also shown in Table 1.

As can be seen from the data in Table 1, the cycle number obtained with the full cells containing 2,2-difluoroethyl propionate or 2,2-difluoroethyl propionate and ethylene carbonate (Examples 1 and 2) were higher than the cycle number obtained with the full cell containing 2,2-difluoroethyl acetate and ethylene carbonate (Comparative Example 1).

TABLE 1

High Temperature Performance of Full Cells

| | Anode/Cathode | Electrolyte | Cycle No. to T80 |
|---|---|---|---|
| Comparative Example 1 | LTO/Fe-LNMO | DFEA + EC | 51 |
| Example 1 | LTO/Fe-LNMO | DFEP | 75 |
| Example 2 | LTO/Fe-LNMO | DFEP + EC | 87 |

What is claimed is:

1. An electrolyte composition comprising (a) at least one electrolyte salt, and (b) at least one fluorine-containing carboxylic acid ester represented by the formula $R^1$—C(O)O—$R^2$,
   wherein
   $R^1$ is $CH_3CH_2$— and $R^2$ is —$CH_2CHF_2$,
   $R^1$ is $CH_3$— and $R^2$ is —$CH_2CH_2CHF_2$,
   $R^1$ is $CH_3CH_2$— and $R^2$ is —$CH_2CH_2CHF_2$,
   $R^1$ is $CHF_2CH_2CH_2$— and $R^2$ is —$CH_2CH_3$, or
   $R^1$ is $CHF_2CH_2$— and $R^2$ is —$CH_2CH_3$;
   wherein the fluorine-containing carboxylic acid ester is prepared with a purity level of at least about 99.9%.

2. The electrolyte composition of claim 1, wherein the fluorine-containing carboxylic acid ester is $CH_3CH_2$—COO—$CH_2CF_2H$ or $CH_3$—COO—$CH_2CH_2CF_2H$.

3. The electrolyte composition of claim 1 further comprising at least one carbonate co-solvent.

4. The electrolyte composition of claim 3 wherein the carbonate co-solvent is selected from the group consisting of ethyl methyl carbonate, dimethyl carbonate, diethyl carbonate, ethylene carbonate, propylene carbonate, vinylethylene carbonate, fluoroethylene carbonate, 2,2,2-trifluoroethyl carbonate, and methyl 2,2,3,3-tetrafluoropropyl carbonate.

5. The electrolyte composition of claim 1 wherein the electrolyte salt is selected from one or more members of the group consisting of:
   lithium hexafluorophosphate,
   Li $PF_3(CF_2CF_3)_3$,
   lithium bis(trifluoromethanesulfonyl)imide,
   lithium bis (perfluoroethanesulfonyl)imide,
   lithium (fluorosulfonyl) (nonafluorobutanesulfonyl)imide,
   lithium bis(fluorosulfonyl)imide,
   lithium tetrafluoroborate,
   lithium perchlorate,
   lithium hexafluoroarsenate,
   lithium trifluoromethanesulfonate,
   lithium tris (trifluoromethanesulfonyl)methide,
   lithium bis(oxalato)borate,
   lithium difluoro(oxalato)borate,
   $Li_2B_{12}F_{12-x}H_x$ where x is equal to 0 to 8, and
   a mixture of lithium fluoride and an anion receptor.

6. The electrolyte composition of claim 1 further comprising at least one film-forming additive.

7. An electrochemical cell comprising:
   (a) a housing;
   (b) an anode and a cathode disposed in said housing and in ionically conductive contact with one another;
   (c) an electrolyte composition disposed in said housing and providing an ionically conductive pathway between said anode and said cathode, wherein the electrolyte composition comprises:
      (i) at least one electrolyte salt; and
      (ii) at least one fluorine-containing carboxylic acid ester represented by the formula $R^1$—C(O)O—$R^2$,
      wherein
      $R^1$ is $CH_3CH_2$— and $R^2$ is —$CH_2CHF_2$,
      $R^1$ is $CH_3$— and $R^2$ is —$CH_2CH_2CH F_2$,
      $R^1$ is $CH_3CH_2$— and $R^2$ is —$CH_2CH_2CHF_2$,
      $R^1$ is $CHF_2CH_2CH_2$— and $R^2$ is —$CH_2CH_3$, or
      $R^1$ is $CHF_2CH_2$— and $R^2$ is —$CH_2CH_3$; and
   (d) a porous separator between said anode and said cathode;
   wherein the fluorine-containing carboxylic acid ester is prepared with a purity level of at least about 99.9%.

8. The electrochemical cell of claim 7, wherein the electrolyte composition further comprises at least one carbonate co-solvent.

9. The electrochemical cell of claim 8 wherein the carbonate co-solvent is selected from the group consisting of ethyl methyl carbonate, dimethyl carbonate, diethyl carbonate, ethylene carbonate, propylene carbonate, vinylethylene carbonate, fluoroethylene carbonate, 2,2,2-trifluoroethyl carbonate, and methyl 2,2,3,3-tetrafluoropropyl carbonate.

10. The electrochemical cell of claim 7, wherein said electrochemical cell is a lithium ion battery.

11. The lithium ion battery of claim 10, wherein the anode is lithium titanate or graphite.

12. An electronic device comprising an electrochemical cell according to claim 7.

13. A lithium ion battery, comprising:
   (a) a housing;
   (b) an anode and a cathode disposed in said housing and in ionically conductive contact with one another;
   (c) an electrolyte composition disposed in said housing and providing an ionically conductive pathway between said anode and said cathode, wherein the electrolyte composition comprises:

(i) at least one electrolyte salt: and
(ii) at least one fluorine-containing carboxylic acid ester represented by the formula $R^1$—C(O)O—$R^2$, wherein
$R^1$ is $CH_3CH_2$— and $R^2$ is —$CH_2CHF_2$,
$R^1$ is $CH_3$— and $R^2$ is —$CH_2CH_2CHF_2$,
$R^1$ is $CH_3CH_2$— and $R^2$ is —$CH_2CH_2CHF_2$,
$R^1$ is $CHF_2CH_2CH_2$— and $R^2$ is —$CH_2CH_3$, or
$R^1$ is $CHF_2CH_2$— and $R^2$ is —$CH_2CH_3$; and (d) a porous separator between said anode and said cathode;

wherein the cathode comprises a lithium-containing manganese composite oxide having a spinel structure as active material, the lithium-containing manganese composite oxide being represented by the formula:

$$Li_xNi_yM_zMn_{2-y-z}O_{4-d},$$

wherein x is 0.03 to 1.0; x changes in accordance with release and uptake of lithium ions and electrons during charge and discharge; y is 0.3 to 0.6; M comprises one or more of Cr, Fe, Co, Li, Al, Ga, Nb, Mo, Ti, Zr, Mg, Zn, V, and Cu; z is 0.01 to 0.18, and d is 0 to 0.3.

14. The lithium ion battery of claim 13, wherein y is 0.38 to 0.48, z is 0.03 to 0.12, and d is 0 to 0.1 and wherein M is one or more of Li, Cr, Fe, Co, and Ga.

* * * * *